United States Patent [19]

Oury

[11] Patent Number: 4,521,673
[45] Date of Patent: Jun. 4, 1985

[54] ATTACHMENT FOR SUPPLYING A FILLER WIRE TO AN ELECTRIC SOLDERING IRON OF THE PEN TYPE

[75] Inventor: Jean-Claude Oury, Villepinte, France

[73] Assignee: Societe anonyme dite: Prestinox S.A., Villepinte, France

[21] Appl. No.: 497,659

[22] Filed: May 24, 1983

[51] Int. Cl.³ .......................... H05B 3/02; B23K 3/06
[52] U.S. Cl. ................................... 219/230; 219/235; 219/533; 226/128; 228/53
[58] Field of Search ............... 219/230, 241, 533, 235; 226/127, 128; 228/51-55

[56] References Cited

U.S. PATENT DOCUMENTS

| 2,432,428 | 12/1947 | Lang | 228/52 |
|---|---|---|---|
| 2,558,009 | 6/1951 | Smoke | 226/127 |
| 2,604,064 | 7/1952 | Sefton | 226/128 |
| 2,833,904 | 5/1958 | Cunningham | 228/53 |
| 3,190,529 | 6/1965 | Bellamy | 228/53 |
| 3,531,038 | 9/1970 | Dezzami | 228/52 |
| 3,852,565 | 12/1974 | Kager | 219/241 |
| 4,411,379 | 10/1983 | Gravel | 228/52 |

FOREIGN PATENT DOCUMENTS

| 1262470 | 3/1968 | Fed. Rep. of Germany | 219/230 |
|---|---|---|---|
| 1440589 | 11/1968 | Fed. Rep. of Germany | |
| 2110077 | 9/1972 | Fed. Rep. of Germany | |
| 2318689 | 10/1974 | Fed. Rep. of Germany | |
| 1545265 | 9/1968 | France | 219/230 |
| 2201157 | 4/1974 | France | |
| 356851 | 10/1961 | Switzerland | 219/230 |
| 463141 | 3/1937 | United Kingdom | 228/53 |
| 2057323 | 4/1981 | United Kingdom | 219/230 |

Primary Examiner—A. Bartis
Attorney, Agent, or Firm—McAulay, Fields, Fisher, Goldstein & Nissen

[57] ABSTRACT

An attachment for supplying a filler wire to an electric soldering iron of the pen type includes an independent support butt having an upper housing provided with a V-shaped groove defined by two lateral faces of a dihedron. The cylindrical body portion of a pen type soldering iron is received in the groove and fixed therein by a flexible, length adjustable clamp passing around the body and having its ends fastened to the butt so as to maintain the body tangentially to the faces of the dihedron so that it forms a unit with the butt. The adjustable clamp permits soldering irons whose bodies are of different diameters to be immobilized in the groove. The support butt is provided with a manually operable trigger actuated mechanism for incrementally feeding and guiding a length of filler wire toward the heated tip of the supported soldering iron during use. The power supply lead for the electric heating element of the electric soldering iron extends through a passage in the support butt.

16 Claims, 3 Drawing Figures

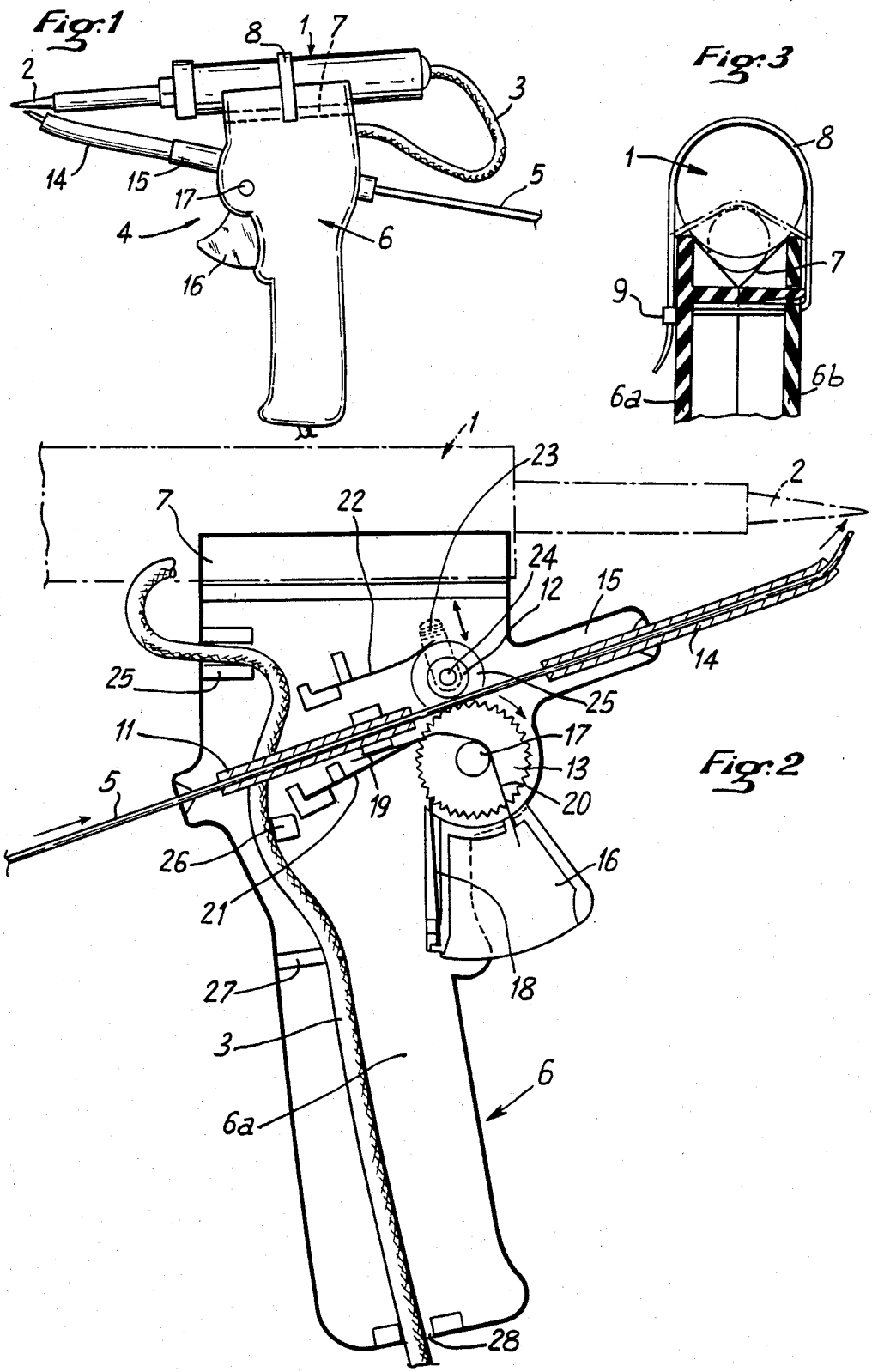

ATTACHMENT FOR SUPPLYING A FILLER WIRE TO AN ELECTRIC SOLDERING IRON OF THE PEN TYPE

BACKGROUND OF THE INVENTION

The present invention relates to a device for supplying a filler wire for an electric soldering iron of the pen type.

To effect welding of electrical wires, in the domain of wiring, the operator generally holds the electric soldering iron of the pen type in one hand and the filler wire in the other, which renders the welding operation awkward and requires that the pieces to be welded be previously maintained in contact with one another.

To overcome these drawbacks, it has already been envisaged to provide electric soldering irons comprising a device for supplying filler wire which is integrated in the iron. Although such an arrangement enables the above problems to be solved, nonetheless this solution is applicable only to relatively sophisticated and expensive soldering irons and it is not suitable for current electric soldering irons of the pen type.

SUMMARY OF THE INVENTION

It is an essential object of the present invention to overcome these drawbacks by providing a device of particularly simple design which may be easily adapted to electric soldering irons.

To this end, the device for supplying a filler wire for an electric soldering iron of the pen type is characterized in that it comprises a support forming a butt having, in its upper part, a housing adapted to receive the soldering iron, means for fixing the soldering iron in this housing so that it forms a body with the butt and, in the butt-shaped support, means for advancing the filler wire and for guiding this wire in the direction of the heating tip of the soldering iron.

The supply device according to the invention has the advantage that it may be made in the form of an assembly adapted to be associated with any soldering iron of the pen type. Due to the addition of such a supply device to a soldering iron of the pen type, the user uses only one hand to hold the "gun" formed by the electric soldering iron and its butt-shaped support containing the device for supplying the filler wire and consequently he may use his other hand for holding the pieces to be welded together. It is therefore much easier to use the soldering iron.

BRIEF DESCRIPTION OF THE DRAWINGS

The invention will be more readily understood on reading the following description with reference to the accompanying drawings, in which:

FIG. 1 is a view in elevation of a device for supplying a filler wire assembled with an electric soldering iron of the pen type.

FIG. 2 is a view in vertical section, on a larger scale, of the butt-shaped support of the filler wire supply device.

FIG. 3 is a view in vertical, transverse section of the upper part of the support where the electric soldering iron is fixed.

DESCRIPTION OF THE PREFERRED EMBODIMENTS

Referring now to the drawings, FIG. 1 shows an electric soldering iron 1 of the pen type which conventionnaly comprises a heating tip 2 and which is connected to a source of electric current by a conducting lead 3. This electric soldering iron 1 is shown in FIG. 1 assembled with a device generally designated by 4 and which is provided for automatically supplying filler wire 5. The supply device 4 comprises a support 6 for the soldering iron 1, this support constituting an ergonomic butt. This butt 6 is advantageously constituted by two shells 6a, 6b made of moulded plastic material and assembled against each other by simple clipping, defining an internal volume in which is housed the mechanism controlling the advance of the filler wire 5. These two shells may be opened without having to use any tool, due to their connection by simple clipping. Furthermore, all the pieces of the mechanism are permanently mounted on one shell and they are fixed by the other shell when the latter is applied on the former. In its upper part, the butt 6 has a housing 7 for the body of the soldering iron 1. This housing 7 is advantageously constituted by a groove of V-section, i.e. in the form of an upwardly open dihedron whose two side faces are provided respectively on the two shells 6a and 6b. The cylindrical body of the soldering iron 1 is maintained tangential to the two faces of the dihedron constituting the groove 7, by any appropriate means, for example by a clamp 8 made of supple plastics material of which one end is fixed to one of the shells 6b, which passes around the cylindrical body of the soldering iron 1, and of which the other end part is fastened to the other shell 6a, for example by passing in a lug 9 integral with the outer face of this shell. This mode of fixation makes it possible to immobilize soldering irons whose cylindrical bodies have different diameters. FIG. 3 shows how a large-diameter soldering iron 1, shown in solid lines, is immobilized in the groove 7 and how a small-diameter soldering iron, shown in chain-dotted lines, is likewise immobilized in this groove, by means of the same supple clamp 8.

In the internal volume of the butt 6 are housed the various elements constituting the mechanism controlling the advance and guiding of the filler wire 5. This filler wire passes right through the butt 6, in forward direction, being inclined with respect to the axis of the soldering iron 1 and directed towards the heating tip 2. From the rear to the front, the filler wire 5 passes successively through a first guide tube 11, then between a presser roller 12 located above the wire 5 and a toothed drive wheel 13 located below the wire, then through a second guide tube 14 lying in the axis of the first tube 11 and which is engaged in a boss 15 on the butt directed towards the heating tip 2. The end of the second guide tube 14 may be slightly curved, as shown in FIG. 2, to direct the end part of the filler wire 5 towards the end of the heating tip 2.

The advance of the filler wire 5 towards the end of the heating tip 2 is controlled by a trigger 16 which is pivotally mounted on a transverse pivot pin 17 about which the toothed wheel 13 also rotates. The trigger 16 bears a flat spring 18 which is substantially tangential to the toothed drive wheel 13 and whose free end is in contact with the teeth of the wheel 13. The trigger 16 is returned by a spring 20 which may for example be wound on the pivot pin 17, of which one arm abuts on a fixed stop 19 provided in the shell 6a and of which the other arm acts on the trigger 16. Another flat non-return spring 21 is fixed, at one of its ends, in the shell 6a of the butt 6 and its free end is in contact with the teeth of the wheel 13.

To advance the filler wire 5, the operator presses on the trigger 16, which causes it to rotate in clockwise direction in FIG. 2. The trigger 16 takes along the toothed wheel 13 in its movement since the flat spring 18 is in mesh with the teeth of this wheel and provokes rotation thereof. Furthermore, the upper presser roller 12 is applied on the wire 5, under the action of a flat spring 22, so that the wire is pressed between this upper roller 12 and the lower drive wheel 13. The rotation of the wheel 13 therefore brings about an axial translation of wire 5. The amplitude of this translation depends on the pivoting stroke of the trigger 16.

When the user releases the trigger 16, the latter returns into rest position under the action of its return spring 20, the flat drive spring 18 then sliding on the teeth without driving the wheel 13. This wheel is maintained against any movement in reverse direction, i.e. in anticlockwise direction, by the flat non-return spring 21.

The supply device 4 also comprises a knob 23 for disengaging the presser roller 12. This presser roller is borne by a spindle 24 which also passes through two flat washers 25 disposed on either side of the central presser roller in contact with the wire 5. Each of these washers 25 is subjected to the action of a flat spring 22 which applies, under pressure, the central presser roller 12 on the wire 5. The disengaging knob 23 which is located outside the butt 6 is movable between two positions, namely an engaged position in which the presser roller 12, released, is applied under pressure on the filler wire 5, and a disengaged position in which this roller is spaced apart from the wire, which makes it possible to move the latter freely in order to position or adjust it.

The conducting lead 3 of the soldering iron 1 is advantageously imprisoned between the two shells 6a, 6b constituting the butt 6. This lead 3 penetrates in the butt 6 through an inlet orifice 25 provided in the upper rear vertical face of the butt 6 and defined by bosses integral therewith, it is maintained in position, inside the butt 6, by the other bosses 26, 27 likewise integral therewith, and it emerges from this butt on its lower face through an orifice 28.

From the foregoing description, it is seen that the assembly formed by the electric soldering iron 1 and the supply device 4 constitutes a welding gun which is very convenient to use in one hand.

In the particular embodiment described hereinabove, the filler wire 5 is shown as being introduced into the butt 6 at the rear thereof and emerging at the front. According to a variant embodiment, it may be envisaged to house a reserve of coiled wire inside the butt, which unwinds progressively as it is used. To this end, it suffices to provide means inside the butt 6 for receiving this coil of wire and for ensuring guiding of the unwound wire.

Similarly, the mechanism for advancing the filler wire 5 may be different, constituted by any mechanical device for advancing the wire 5 step by step. An electrical supply may also be provided, using an electric motor incorporated in the butt 6 whose supply is controlled by a push button switch.

What I claim is:

1. A device for supplying a filler wire for an electric soldering iron having a cylindrical body with a conductive lead and a heating tip, comprising:
    a support butt;
    said butt having an upper part;
    said upper part including a housing in the form of a V-shaped groove, said groove being defined by two lateral faces of a dihedron and being adapted to receive and support the cylindrical body of a soldering iron;
    flexible length-adjustable means on said butt for fixing the body of the iron in said groove; and
    means in said support butt for advancing a filler wire and for guiding the wire in the direction of a heating tip on the body of the soldering iron.

2. The device as claimed in claim 1, wherein said means for fixing the body of the iron consists of a flexible clamp passing around the body and having ends fastened on said butt so as to maintain the body tangentially to said faces of said dihedron.

3. The device as defined in claim 2, wherein said butt comprises two shells assembled against each other by clipping and defining an internal space, said means for advancing said filler wire being housed in said space;
    said lateral faces of said groove being provided respectively on said two shells;
    said clamp being fixed at one of its ends on one of the shells and being fastened at its other end to the other shell.

4. The device as defined in claim 1, wherein said butt includes an inlet and an outlet for the wire, a first guide tube between said inlet and outlet, a second guide tube projecting from said outlet and directed toward the heating tip of the iron; a toothed wheel adapted to contact the wire; a trigger for actuating said wheel and advancing the wire toward said tip; and a return spring connected to said trigger for returning said trigger.

5. The device as defined in claim 4, further including a spring urged pressure roller mounted above said wheel adapted to engage the wire, and means for selectively engaging and disengaging said roller from contact with the wire.

6. The device as claimed in claim 1, wherein the body of the soldering iron adapted to be received and supported in said groove includes a conductive lead and said butt has an inlet and outlet for passage of the lead through said butt, and means in said butt for maintaining the lead in place.

7. In a device for supplying a filler wire for an electric soldering iron having a cylindrical body with a conductive lead and a heating tip;
    a support butt;
    said butt having an upper part;
    said upper part including a housing in the form of a V-shaped groove, said groove being defined by two lateral faces of a dihedron and being adapted to receive and support the cylindrical body of a soldering iron; and
    flexible length-adjustable means on said butt for fixing the body of the iron in said groove;
    said means consisting of a clamp formed of flexible material having ends fastened to said butt and passing around the body of the soldering iron for maintaining the body tangentially to said faces of said dihedron.

8. In a device as defined in claim 7, said butt comprising two shells assembled against each other by clipping and defining an internal space; a mechanism in said space for controlling the advance of the wire;
    said lateral face of said V-shaped groove being provided respectively on said shells;

said clamp being fixed at one of its ends on one of the shells and being fastened at its other end to the other shell.

9. In a device as defined in claim 7, wherein said butt has an inlet and an outlet for the wire;
- a first guide tube in said butt between said inlet and outlet;
- a second guide tube projecting from said outlet and directed toward the heating tip of the iron;
- a toothed wheel adapted to contact the wire;
- a trigger for actuating said wheel and thereby advancing the wire toward the tip; and
- a return spring for actuating said trigger.

10. In a device as defined in claim 9, further including a spring-urged presser roller mounted above said wheel adapted to engage the wire, and means for selectively engaging and disengaging said roller from contact with the wire.

11. In a device as defined in claim 7, wherein the body of the soldering iron adapted to be received and supported in said groove includes a conductive lead and said butt has an inlet and outlet for passage of the lead through said butt and means in said butt for maintaining the lead in place.

12. In a device as defined in claim 7, wherein:
- said butt comprises two shells assembled against each other by clipping and together assembled defining an internal space, means for advancing the filler wire being housed in the internal space;
- the lateral faces of said groove being provided respectively on the two shells; and
- said means fixing the body of the iron consists of a flexible clamp passing around the body and having ends fastened to said butt; the clamp being fixed at one of its ends on one of the shells and being fastened at its other end to the other shell.

13. In a device as defined in claim 12, said butt including:
- an inlet and a outlet, and a guide tube between said inlet and said outlet for the wire;
- said means for advancing the wire including a toothed wheel adapted to contact with the wire; a trigger for actuating said wheel and advancing the wire toward the tip; and
- a return spring connected to said trigger for returning said trigger.

14. In a device as defined in claim 13, further including a spring urged pressure roller mounted above said wheel adapted to contact the wire, and means for engaging and disengaging said roller from contact with the wire.

15. In a device as defined in claim 14, wherein said outlet is higher than said inlet for directing the wire upwardly below toward the tip.

16. In combination with an electric soldering iron having a cylindrical body, a conductive lead and a heating tip;
- a device for supplying a filler wire to said iron, comprising:
- a support butt consisting of two interfitting shells;
- said butt having a housing in the upper part thereof including a groove for receiving and supporting at least the lower part of said cylindrical body therein;
- flexible length-adjustable clamp means on said butt for securing said body in said groove;
- an inlet and an outlet for the filler wire in said butt, said outlet being positioned on a higher plane than said inlet for directing said wire upwardly toward said tip,
- a gear adapted to engage against the wire for advancing same toward said tip;
- a presser wheel mounted above the wire;
- a spring means adapted to urge said wheel against the wire;
- means for selectively bringing said presser wheel in and out of contact with the wire; and
- a trigger connected to said gear for actuating the same, and return means for returning said trigger to inoperative position.

* * * * *